US009917889B2

(12) United States Patent
Finkelstein et al.

(10) Patent No.: US 9,917,889 B2
(45) Date of Patent: Mar. 13, 2018

(54) ENTERPRISE SERVICE BUS ROUTING SYSTEM

(71) Applicant: eBay Inc., San Jose, CA (US)

(72) Inventors: Yuri Finkelstein, San Carlos, CA (US);
Konstantin Yurin, Sunnyvale, CA (US); Sergey Smirnoff, Fremont, CA (US)

(73) Assignee: eBay Inc., San Jose, CA (US)

( * ) Notice: Subject to any disclaimer, the term of this patent is extended or adjusted under 35 U.S.C. 154(b) by 701 days.

(21) Appl. No.: 13/666,742

(22) Filed: Nov. 1, 2012

(65) Prior Publication Data

US 2014/0122572 A1   May 1, 2014

(51) Int. Cl.
*G06F 15/16*   (2006.01)
*H04L 29/08*   (2006.01)

(52) U.S. Cl.
CPC .......... *H04L 67/1014* (2013.01); *H04L 67/10* (2013.01)

(58) Field of Classification Search
CPC ........................... H04L 67/1014; H04L 67/10
USPC ...................................................... 709/203
See application file for complete search history.

(56) References Cited

U.S. PATENT DOCUMENTS

| | | | |
|---|---|---|---|
| 7,231,550 B1* | 6/2007 | McGuire ............. | G06F 11/0709 714/26 |
| 8,046,460 B1* | 10/2011 | Greenidge et al. ........... | 709/225 |
| 2002/0143744 A1* | 10/2002 | Teng ................. | G06F 17/30864 |
| 2007/0074215 A1* | 3/2007 | Bethea ................... | H04L 67/02 718/101 |
| 2008/0155665 A1* | 6/2008 | Ruppert et al. ................... | 726/5 |
| 2009/0157642 A1* | 6/2009 | Diab ................. | G06F 17/30864 |
| 2010/0042699 A1* | 2/2010 | Hernandez et al. .......... | 709/206 |
| 2011/0202667 A1* | 8/2011 | Kimball et al. .............. | 709/228 |

OTHER PUBLICATIONS

Key factors in web latency savings in an experimental prefetching system (Springer Science+Business Media; 2010; pp. 194, 197).*

* cited by examiner

*Primary Examiner* — Glenton B Burgess
*Assistant Examiner* — Tan Doan
(74) *Attorney, Agent, or Firm* — Schwegman Lundberg & Woessner, P.A.

(57) ABSTRACT

According to various example embodiments, a request transmitted from a client and directed to a service application is intercepted. A logical database (DB) host specified by a hint value included in the request is then identified. Moreover, a target physical DB host is identified, based on the identified logical DB host and DB host mapping information. Thereafter, the request is routed to an instance of the service application co-located with the identified target physical DB host at a particular data center.

19 Claims, 13 Drawing Sheets

```
<data-source action="update" name="CORE_gbpgw"/>                                    ——1001
    <database-name></database-name>
    <minimum-pool-size>0</minimum-pool-size>
    <maximum-pool-size>27</maximum-pool-size>
    <connection-timeout>1</connection-timeout>
    <idle-timeout>600</idle-timeout>
    <orphan-timeout>30</orphan-timeout>
    <statement-cache-size>500</statement-cache-size>
    <default-user></default-user>
    <default-password></default-password>
    <disable-auto-connectioncleanup>false</disable-auto-connectioncleanup>
    <description></description>
    <jndi-name>jdbc/CORE_gbpgw</jndi-name>
    <logging-options>-1</logging-options>
    <config-properties>
        <property name="URL"                                                        ——1002
            value="jdbc:oracle:thin:@gbpgw.vip.ebay.com:1521:GBPGW"/>                ——1003
        <property name="user" value="gbpgw_app"/>
        <property name="password" value="gbpgw_app"/>
        <property name="driverType" value=""/>
        <property name="driverConfig" value=""/>
        <property name="autoFlushType" value=""/>
        <property name="connRateThrottle" value=""/>
        <property name="connectionProperties"
            value="oracle.jdbc.V8Compatible=true;oracle.jdbc.TcpNoDelay=true;oracle.j
dbc.RetainV9LongBindBehavior=true"/>
    </config-properties>
</data-source>
```

*Fig. 10*

| IP Range | Data Center / Colo |
|---|---|
| 10.1 | DEN |
| 10.2 | PHX |
| 10.3 | SC4 |
| 10.4 | QSX |
| 10.5 | QSX |
| 10.6 | SJC |
| 10.8 | SMF |
| 10.9 | SMF |
| 10.10 | SRW |

| Instance of Service Application | Endpoint of Service Application (Data Center / Colo) |
|---|---|
| S1 | DEN |
| S2 | PHX |
| S3 | SC4 |
| S4 | QSX |
| S5 | SJC |
| S6 | SMF |
| S7 | SRW |

Fig. 12

ENTERPRISE SERVICE BUS ROUTING SYSTEM

TECHNICAL FIELD

The present application relates generally to the field of electronic data and, in one specific example, to systems and methods for routing requests for electronic data.

BACKGROUND

In various service-oriented architecture (SOA) environments, requests for data may be transmitted from a client to a service application deployed at a data center. After the service application receives the request, the service application identifies a physical server that has access to the requested data. In particular, many enterprises have large numbers of physical servers hosting data, where the physical servers are typically distributed between different data centers that may be geographically remote from each other. Thus, the service application may be required to forward the data request to another data center at which the appropriate physical server is located.

BRIEF DESCRIPTION OF THE DRAWINGS

Some embodiments are illustrated by way of example and not limitation in the figures of the accompanying drawings in which:

FIG. 10 illustrates an example of an XML file, according to various embodiments.

FIG. 11 illustrates an example of IP range lookup information, according to various embodiments.

FIG. 12 illustrates an example of service application endpoint information, according to various embodiments.

DETAILED DESCRIPTION

Example methods and systems for routing requests for electronic data are described. In the following description, for purposes of explanation, numerous specific details are set forth in order to provide a thorough understanding of example embodiments. It will be evident, however, to one skilled in the art that the present invention may be practiced without these specific details.

Figure 1:
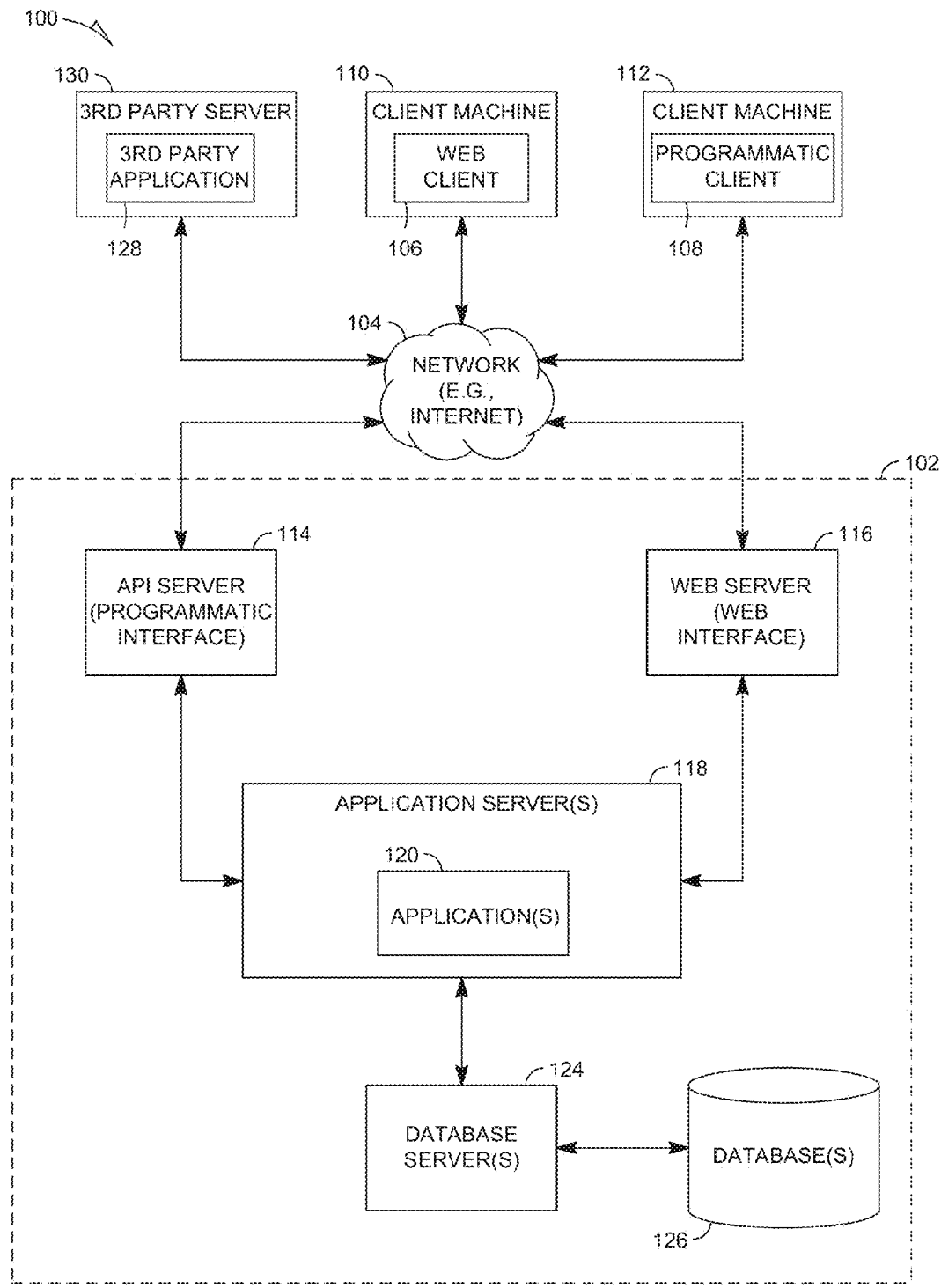
FIG. 1 is a network diagram depicting a client-server system, within which one example embodiment may be implemented.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various example embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
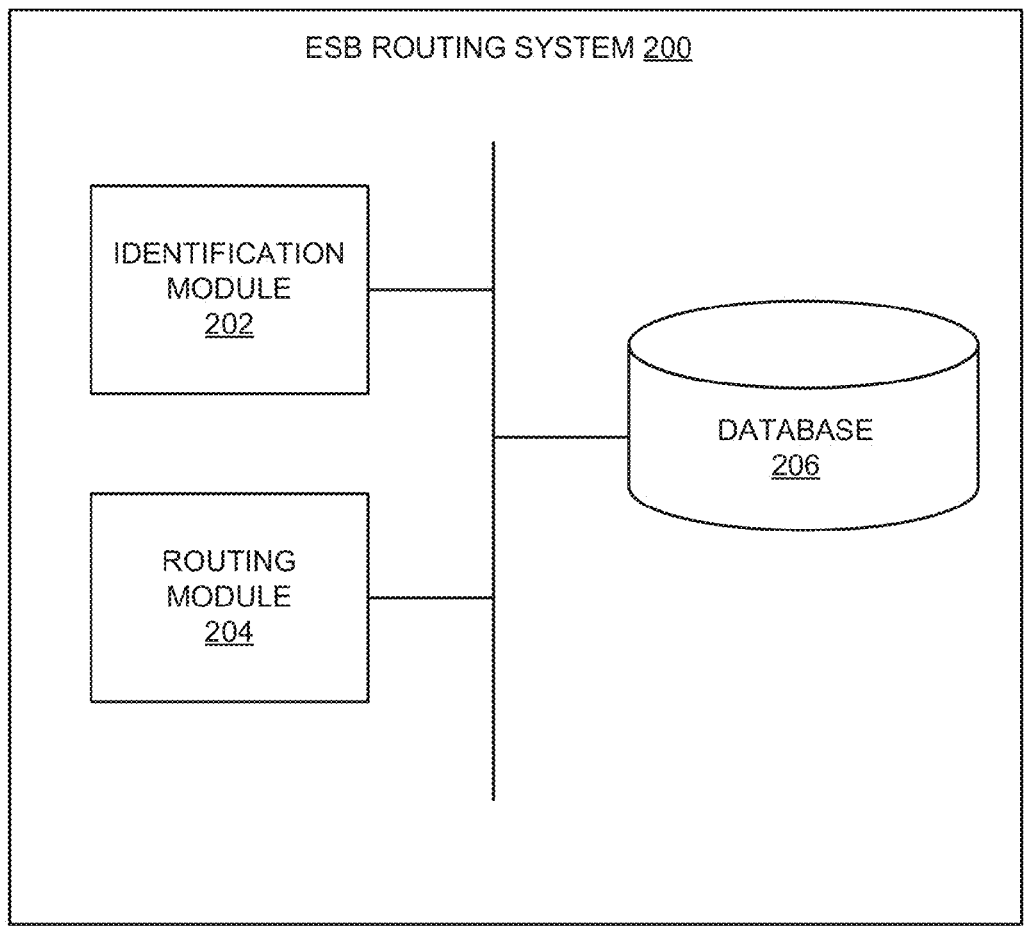
FIG. 2 is a block diagram of an example system, according to various embodiments.

Turning now to FIG. 2, an enterprise service bus (ESB) routing system 200 includes an identification module 202, a routing module 204, and a database 206. The modules of the ESB routing system 200 may be implemented on a single device such as an ESB routing device, or on separate devices interconnected via a network. The aforementioned ESB routing device may correspond to, for example, one of the client machines (e.g. 110, 112) or application server(s) 118 illustrated in FIG. 1. Each of the aforementioned modules of the ESB routing system 200 will now be described, with reference to the system 300 illustrated in FIG. 3.

According to various example embodiments, requests for data (such as SOA service calls) are routed by the ESB routing system 200 to service applications that are proximate to the physical servers that have access to the requested data. Thus, each service application only receives requests for data that are accessible primarily by physical servers already co-located with that service application.

Figure 3:
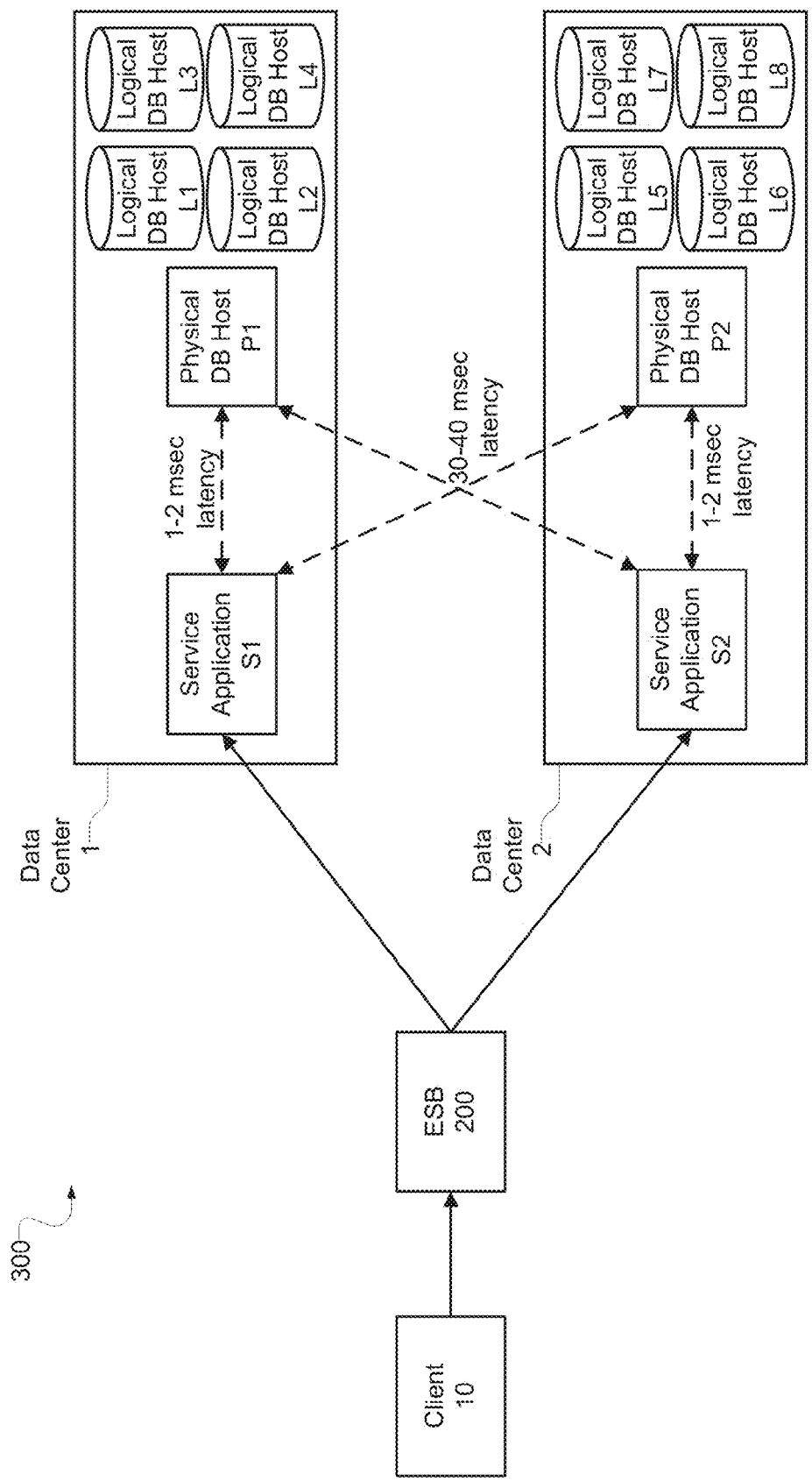
FIG. 3 is a block diagram of an example system, according to various embodiments.

For example, FIG. 3 illustrates an example of a system 300 that includes multiple data centers (also commonly referred to as "colocations" or "colos"), including data center 1 and data center 2. Each data center includes at least one physical server, also referred to as a physical database (DB) host. For example, data center 1 includes physical DB host P1, while data center 2 includes physical DB host P2. Each physical DB host is configured to store information in, for example, a database or similar data structure, as understood by those skilled in the art.

Further, each physical DB host may be partitioned into multiple partitions, also referred to as logical DB hosts. For example, the physical DB host P1 in FIG. 3 has been partitioned into logical DB hosts L1, L2, L3, and L4. Similarly, the physical DB host P2 has been partitioned into logical DB hosts L5, L6, L7, and L8. The data stored in any one of the logical DB hosts is accessible via only one physical DB host or physical "master" host. For example, data sets stored in logical DB hosts L1, L2, L3, or L4 are only available or accessible by physical DB host P1 (which is co-located with the aforementioned logical DB hosts at data center 1), and not by physical DB host P2. Similarly, data sets stored in logical DB hosts L5, L6, L7, or L8 are only available or accessible by physical DB host P2 (which is co-located with the aforementioned logical DB hosts at data center 2), and not by physical DB host P1.

While a database storing information may be located entirely on a single physical server, such as physical DB host P1 or physical DB host P2, it is also possible that such a database of information may be partitioned horizontally, so that partitioned portions or "shards" of the database (which may correspond to, for example, certain rows in a database table) may be located in various logical DB hosts. For example, a particular database may be horizontally partitioned or "sharded" across logical DB hosts L1-L8. Since logical DB hosts L1-L8 reside across multiple data centers (i.e., data center 1 and data center 2 in FIG. 3), the actual partitions or shards of the database also reside in the multiple data centers. As described above, each partition has only a single physical "master" host in a single data center through which that partition may be accessed (by, for example, a service application). For example, if service application S1 is attempting to access the data sets stored at logical DB host L3, the service application S1 must communicate with physical DB host P1, which hosts logical DB hosts L1-L4. On the other hand, if service application S1 is attempting to access the data sets stored at logical DB host L7, the service application S1 must communicate with physical DB host P2, which hosts logical DB hosts L5-L8. Service application S1 and service application S2 may be two different services or two different instances of the same service that are deployed at different data centers (i.e., data center 1 and data center 2 illustrated in FIG. 3). A service or service application may be a software program implemented in a service-oriented architecture (SOA) environment (such as the system 300) as understood by those skilled in the art. FIG. 3 also illustrates an enterprise service bus (ESB) 200, corresponding to the ESB routing system 200 illustrated in FIG. 2.

Referring to FIGS. 2 and 3 together, the identification module 202 of the ESB routing system 200 is configured to intercept a request transmitted from a client that is directed to a service application. For example, the client 10 in FIG. 3 may transmit a request for data to service application S1, and the identification module 202 is configured to detect this request. For instance, the identification module 202 may be configured to analyze all communications inbound to the various data centers and/or service applications (e.g., all communications having a particular service application listed as a destination address in a header of the communication), and determine if any of these communications correspond to a request for data. Upon detection of the request, the identification module 202 is configured to intercept this request, thereby preventing (or delaying) it from being transmitted to its intended destination (e.g., service application S1).

Figure 4:
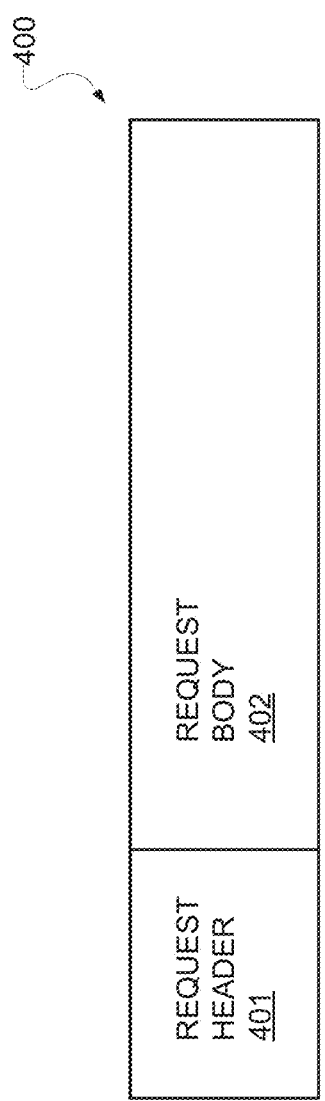
FIG. 4 illustrates an example request, according to various embodiments.

Thereafter, the identification module 202 is configured to inspect the intercepted request to determine if a hint value is included in the request. According to various example embodiments, the hint value specifies a logical DB host (e.g., one of logical DB hosts L1-L8) that contains data of interest that pertains to the request. For example, FIG. 4 illustrates an example of a request 400 transmitted from the client 10, where the request 400 includes a request header 401 and a request body 402. The hint value may be embedded in the header 401 of the request 400, although it is possible that the hint value may instead be included in the body 402 of the request 400. If system 300 represents an SOA environment, the request may be a SOA service call; in such case, the hint value may be embedded in a SOA transport header included in the SOA service call. An example of a header name may be "SOA-ROUTING-HINT". A value of the header field 401 may have the following format: scheme://string. The "scheme" parameter is a prefix referring to the type of the hint. For example, if a large enterprise relies on the use of a data access layer (DAL) framework, then the value of the scheme parameter may be "DAL". Other scheme names may exist. The "string" parameter contains the actual value of the hint. For a DAL scheme, the value may be the name of the logical DB host, e.g., "Logical DB host L7", "1-host7", etc.

After the identification module 202 detects the hint value in the request, the identification module 202 extracts the hint value from the request and identifies a logical DB host based on the information included in the hint value. As described above, the hint value specifies a logical 1 DB host (e.g., one of logical DB hosts L1-L8) that contains data pertaining to the request. That is, if the request is for a particular data set of interest, then the hint value embedded in the request specifies a logical DB host that contains the requested data set. According to an embodiment, the hint value may include a string value of a name of the logical DB host, such as "Logical DB host L7". The hint value may be a static token possessed by the client and representing a specific class of the client.

Note that if the identification module 202 determines that the request does not include a hint value, the identification module 202 routes the request based on a default routing decision. The identification module 202 may store a set of default routing rules (e.g., in database 206), where such rules indicate that, for example, if a request is addressed to service application S1, then the request is to be forwarded to service application S1. As another example, the rules may indicate that if the request specifies any instance of the service application S1, then the identification module 202 may forward the request to a default instance of the service application, such as service application S1.

Figure 5:
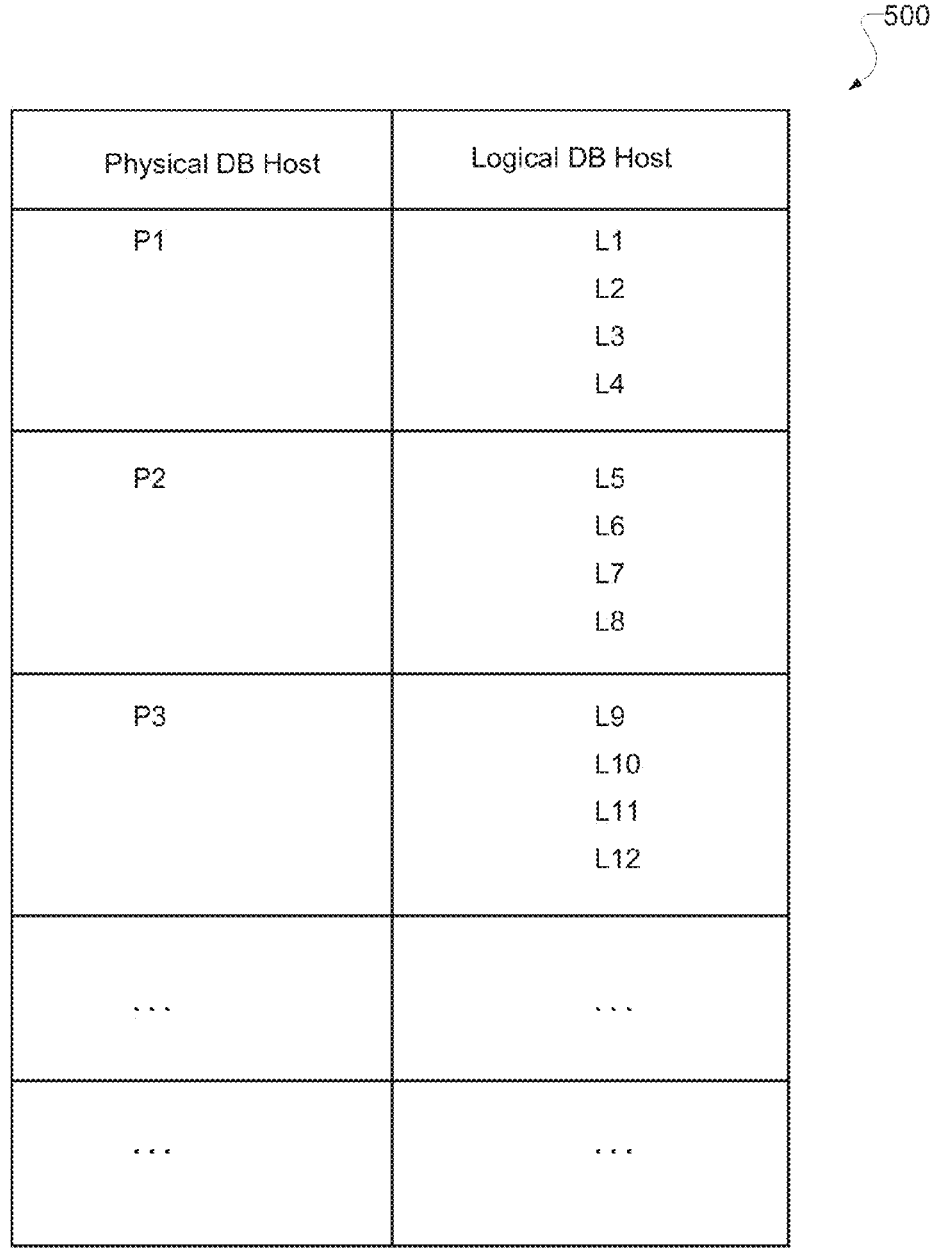
FIG. 5 illustrates an example of mapping information, according to various embodiments.

After identifying a particular logical DB host specified by a hint value included in the request, the identification module 202 identifies a target physical DB host that hosts the particular logical DB host. That is, the identification module 202 identifies the physical host that has access to the data stored in the particular logical DB host, which is typically a physical DB host that is co-located at the same data center as the particular logical DB host. The identification module 202 may make this determination based on DB host mapping information that maps the relationship between various logical and physical DB hosts. For example, FIG. 5 illustrates example mapping information 500 that identifies a number of physical DB hosts (e.g., P1, P2, P3, etc.). Further, the mapping information 500 further indicates one or more logical DB hosts that are hosted/accessible by each of the physical DB hosts. For example, if the hint value in the request specifies "logical DB host L7", then based on the mapping information 500, the identification module 202 will identify physical DB host P2 as the physical master host of logical DB host L7. Put another way, only physical DB host P2 has access to the data stored in logical DB host L7.

As a further example, applications and ESBs in many enterprises that use DAL to access databases often have access to a file called "v3hostmapping.txt" in their configuration. This file may correspond to the aforementioned mapping information 500. The file generally has a simple text line format where each line has the following structure: "gbpgw=tnssecurehost,pgwhost,pgw0host,pgw1host, pgw2host, pgw3host,pgw4host,pgw5host,pgw6host, pgw2host,pgw8host,pgw9host,secureesam shost". The part of this line to the left of the "=" operator contains the name of the data source name (i.e., a name of a physical DB host), and the part of this line to the right of the "=" operator contains the list of logical DB hosts provided by this physical DB host. Given a logical DB host name, the identification module 202 locates a corresponding line in v3hostmapping.txt and extracts the corresponding part to the left of the "=" operator, which is the name of a data source (i.e., the name of the target physical DB host).

Figure 6:
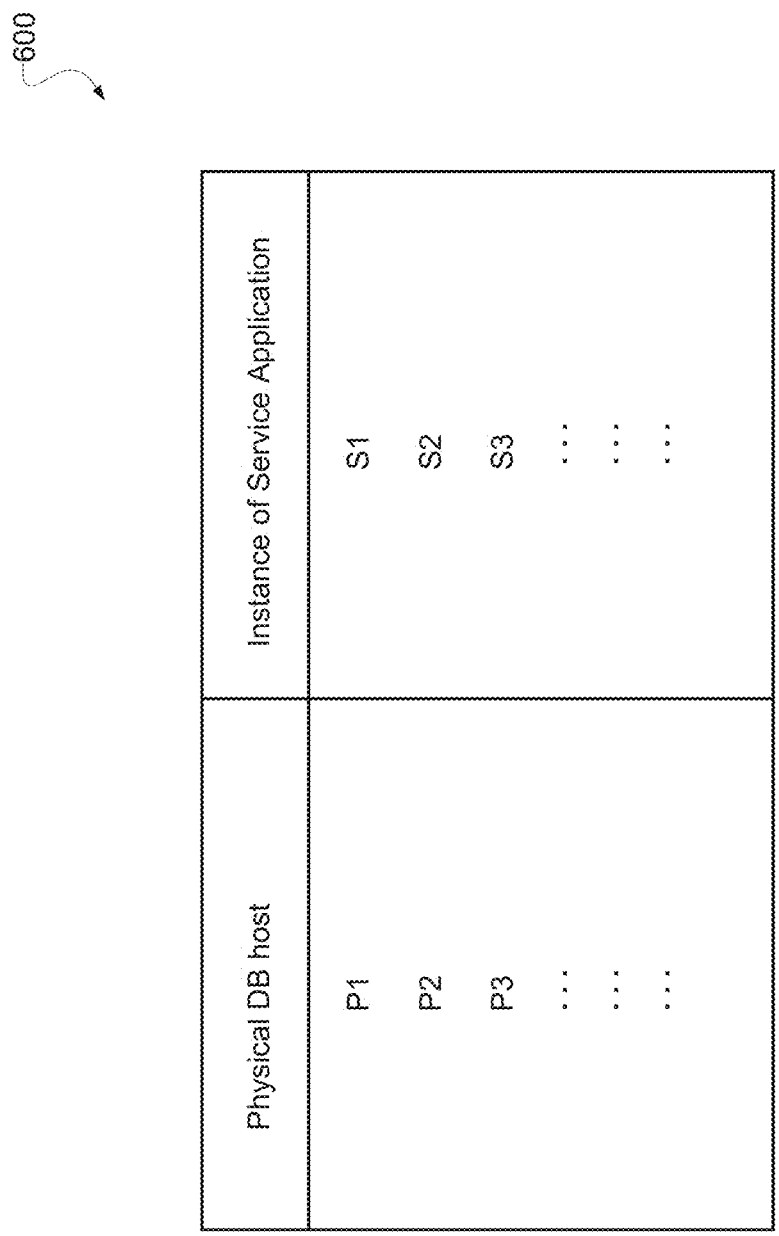
FIG. 6 illustrates an example of host-service co-location information, according to various embodiments.

After identifying the target physical DB host, the identification module 202 identifies a service application (or a particular instance of a service application) that is deployed or co-located at the same data center as the target physical DB host. According to an example embodiment, the identification module 202 may access host-service co-location information that identifies various physical DB hosts, and various service applications (or instances of service applications) that are co-located with the various physical DB hosts. For example, FIG. 6 illustrates example host-service co-location information 600 that identifies various physical DB hosts (e.g., P1, P2, P3, etc.), and the various service applications or instances of service applications (e.g., S1, S2, S3, etc.) that are co-located with the various physical DB hosts. Thus, if the identification module 202 identifies the target physical DB host as P2, as described above in the example above, then based on the host-service co-location information 600, the identification module 202 will identify S2 as a service application or instance of the service application that is co-located with this target physical DB host P2. The host-service co-location information 600 may be generated by the ESB routing system 200, as described in various examples later in this disclosure.

Thereafter, the routing module 204 routes the request to the service application (or instance of the service application) that is co-located with the identified target physical DB host at a given data center. For example, if the identified target physical DB host is P2, then the routing module 204 will route the request to service application S2 as described above. For example, the routing module 204 may insert or modify a destination address in the request to reflect the appropriate service application S2. The request is then transmitted by the ESB routing system 200 to service application S2 (see FIG. 3). After the appropriate service application receives the routed request, that service application forwards the routed request to the target physical DB host. For example, after the service application S2 receives the routed request, the service application S2 examines the request, and determines that the data sets required by the request are stored in the logical DB host L7 accessible by physical DB host P2 that is co-located with the service application S2. Thus, the service application simply forwards the request directly to physical DB host P2, which then accesses the appropriate data sets requested by the request.

Figure 7:
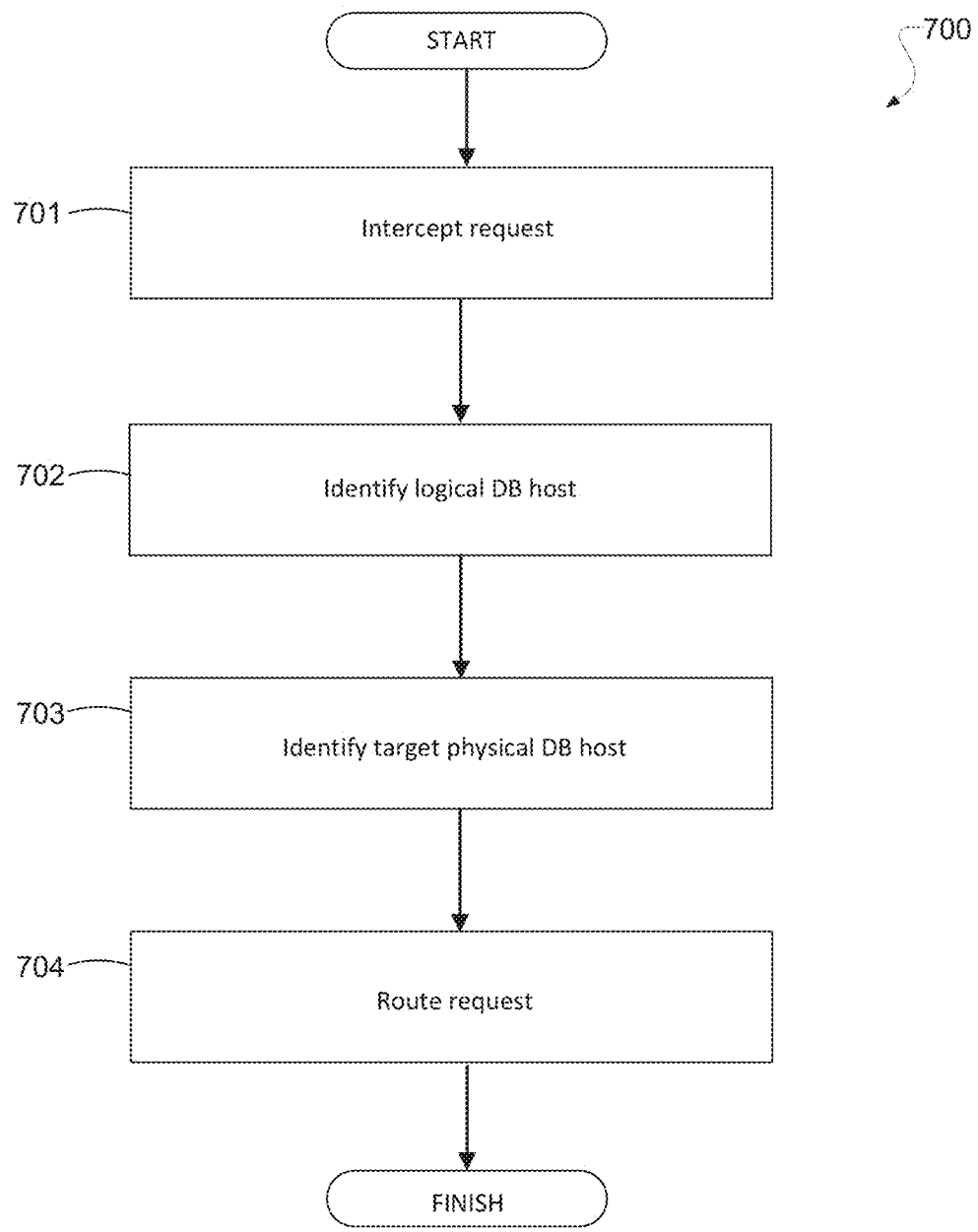
FIG. 7 is a flowchart illustrating an example method, according to various embodiments.

FIG. 7 is a flowchart illustrating an example method 700, according to various embodiments. The method 700 may be performed at least in part by, for example, the ESB routing system 200 illustrated in FIG. 2 (or an apparatus having similar modules, such as client machines 110 and 112 or application server 118 illustrated in FIG. 1). In 701, the identification module 202 intercepts a request transmitted from a client and directed to a service application. In 702, the identification module 202 identifies a logical database (DB) host specified by a hint value included in the request intercepted in 701. In 703, the identification module 202 identifies a target physical DB host, based on the logical DB host identified in 702 and DB host mapping information. In 704, the routing module 204 routes the request to an instance of the service application co-located at a particular data center with the target physical DB host identified in 703.

Thus, according to various example embodiments, requests for data (such as SOA service calls) are routed through the ESB routing system 200 to service applications that are proximate to the physical servers that have access to the requested data. Thus, each service application receives requests for data that are primarily accessible by physical servers already co-located with that service application.

In contrast, in conventional systems, a request transmitted by a client is typically directed to a default service application or to an arbitrary service application, without any determination of whether the data sets required by that request are stored at the same data center as the default service application. Thus, the default service application may need to access a physical DB host located remotely from the default service application in another data center. As a result, the default service application must forward the request to the remote physical DB host that has access to the requested data sets, resulting in a delay in the fulfillment of the request. For example, with reference to FIG. 3, if the service application S1 at data center 1 receives a request and determines that the requested data sets are in fact accessible by physical DB host P2 at data center 2, then the service application S1 must forward the request to the physical DB host P2 at data center 2, which may result in a delay. Such inter-colo latencies vary and can reach 30-40 milliseconds for large enterprises. Given that multiple round trips (e.g., up to 30 trips) between the service application and the physical host may be required in order to fulfill a single request, significant delays are incurred, and the total response time for a single request or SOA call from a client perspective may become quite high.

On the other hand, when a service application communicates with a physical DB host co-located with that service application, the intra-colo latency of such communications is usually quite small (e.g., 1-2 milliseconds) and is generally at least 10 times less than the corresponding inter-colo latency. Thus, according to various example embodiments, a service application only receives requests for data sets that are already co-located with that service application. This can be achieved by utilizing the capability of the ESB routing system 200 to preview the request and make an intelligent decision on a routing destination for the request.

Note that each request may include requests for a number of data sets that may be located in various database partitions across different data centers. However, if the hint value included in the request identifies the physical DB master host that is to be contacted the most frequently (e.g., the physical DB host that has access to the logical DB hosts containing a major portion of the data sets required by the request), then the amount of inter-colo communications to be performed is minimized. Thus, the request may be fulfilled in a significantly reduced time.

As described in various embodiments above, the identification module 202 determines the target physical DB host (703 in FIG. 7), and then the identification module 202 identifies a service application (or a particular instance of the service application) that is deployed or co-located at the same data center as the target physical DB host. The manner in which the identification module 202 identifies the service application proximate to the target physical DB host is now described in more detail.

Figure 8:
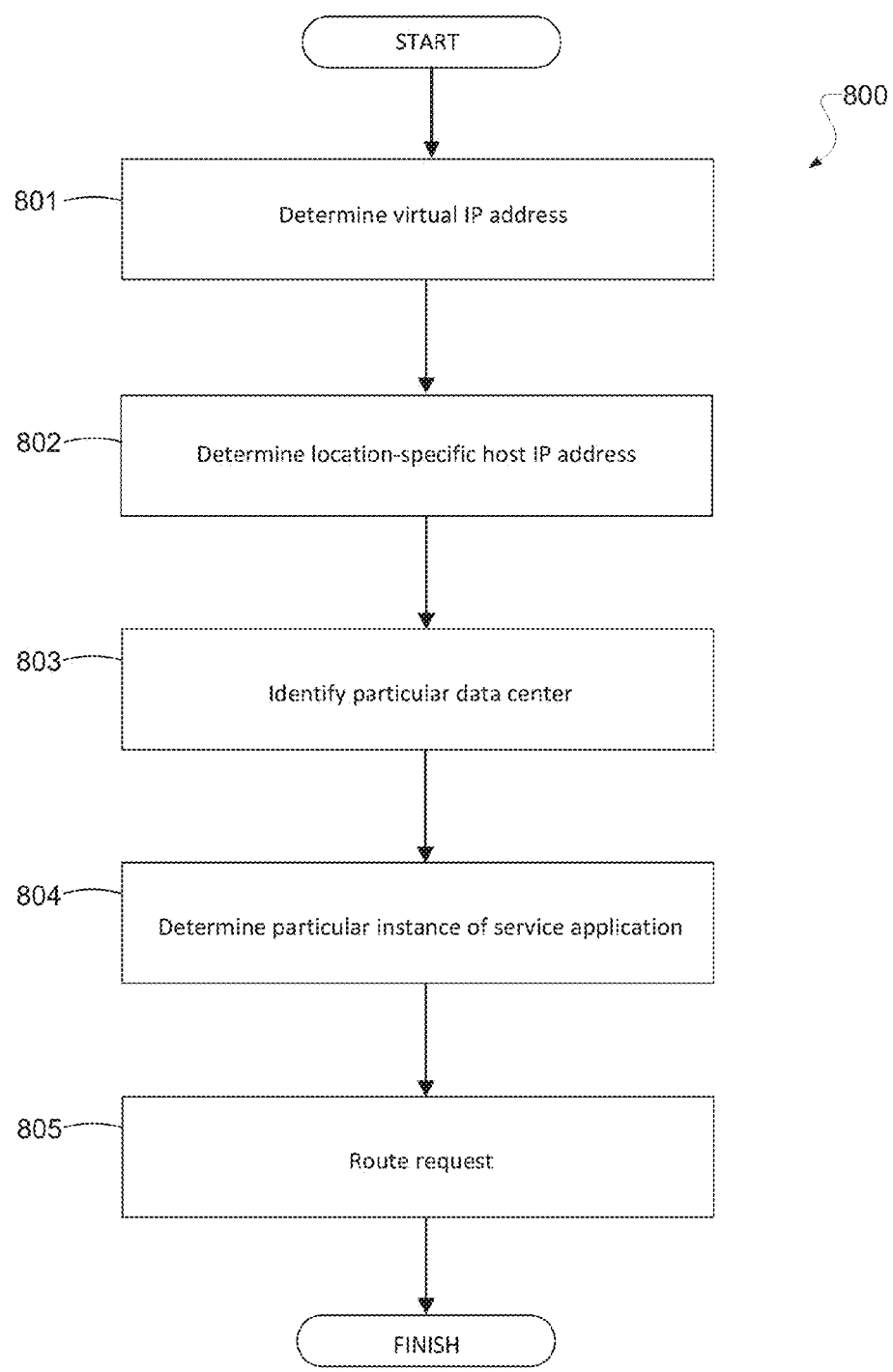
FIG. 8 is a flowchart illustrating an example method, according to various embodiments.

For example, FIG. 8 is a flowchart illustrating an example method 800, according to various embodiments. The method 800 may replace operation 704 in FIG. 7. The method 800 may be performed at least in part by, for example, the ESB routing system 200 illustrated in FIG. 2 (or an apparatus having similar modules, such as client machines 110 and 112 or application server 118 illustrated in FIG. 1). In 801, the identification module 202 determines a virtual IP address of the target physical DB host (which was identified in 703). In 802, the identification module 202 determines a location-specific host IP address of the target physical DB host based on the virtual IP address determined in 801. In 803, the identification module 202 identifies the particular data center where the target physical DB host is located based on the location-specific host IP address of the target physical DB host determined in 802. In 804, the identification module 202 determines that a particular service application or a particular instance of a service application is co-located with the target physical DB host at the particular data center identified in 803. In 805, the routing module 204 routes the request to the particular service application or the particular instance of the service application determined in 804. Each of the aforementioned operations 801 through 804 will now be described in further detail, with reference to FIGS. 9-12.

Figure 9A:
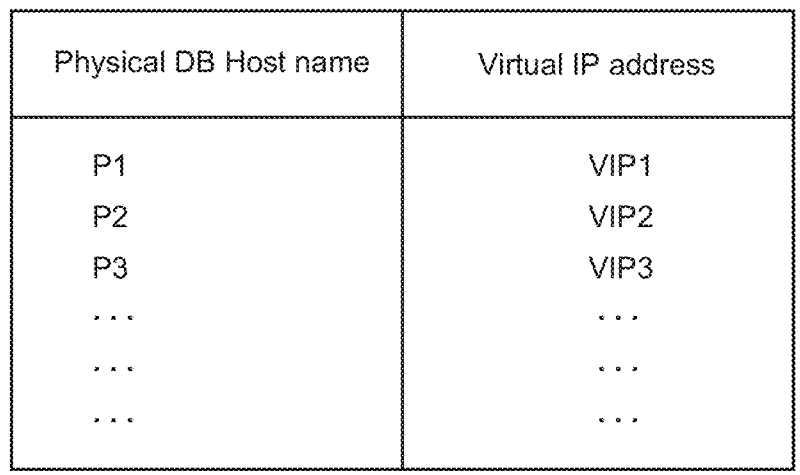
FIG. 9a illustrates an example of information identifying virtual IP addresses corresponding to various physical DB hosts, according to various embodiments.

In 801, the identification module 202 determines a virtual IP address of the target physical DB host. For example, the identification module 202 may access virtual IP address lookup information identifying the virtual IP addresses of various physical DB hosts. For example, FIG. 9a illustrates example virtual IP address lookup information 900 that identifies various physical DB hosts (e.g., P1, P2, P3 etc.) and the virtual IP addresses (e.g., VIP1, VIP2, VIP3, etc.) assigned to each of the physical DB hosts. For example, if the identification module 202 determines that the target physical DB host is P2, then based on the virtual IP address lookup information 900, the identification module 202 will determine that the virtual IP address of physical DB host P2 is VIP2.

Alternatively, service applications and ESBs in many enterprises that use the DAL framework often have access to a file called dsimport.xml in their configuration, and this file may be utilized to determine the virtual IP address assigned to the target physical DB host. FIG. 10 illustrates an example portion 1000 of an entry in such an XML file. Given the data source name (i.e., name of the target physical DB host) such as "gbpgw", the identification module 202 finds a "<data-source>" section with property "name=" containing the extracted data source name "gbpgw" (see line 1001). Note that prefix "CORE_" or "INTERNATIONAL_" may be ignored during this step. After the appropriate data source section is found, the identification module 202 locates the section "<config-properties>" and then locates the line with the property "name="URL"" (see line 1002). The value of this property contains the virtual IP address of the physical host name after the '@' symbol and before the ':' symbol (see line 1003). In the illustration of FIG. 10, the virtual IP value is "gbpgw.vip.ebay.com". This name may then be extracted by the identification module 202 as the virtual IP address of the target physical DB host.

Figure 9B:
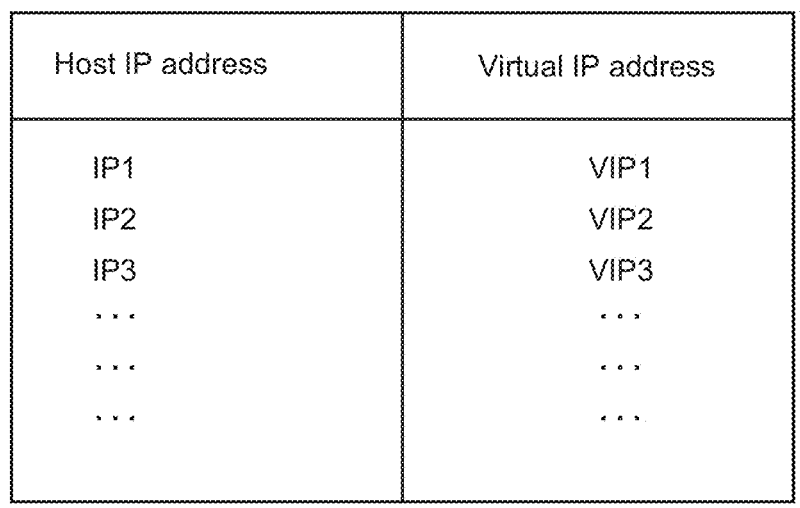
FIG. 9b illustrates an example of information identifying host IP addresses corresponding to various virtual IP addresses, according to various embodiments.

In 802, the identification module 202 determines a location-specific host IP address of the target physical DB host, based on the virtual IP address determined in 801. For example, the identification module 202 may access lookup information indicating a number of host IP addresses, and virtual IP addresses associated with each host IP address. For example, FIG. 9b illustrates lookup information 900 indicating a number of numeric host IP addresses (e.g., IP1, IP2, IP3, etc.), and virtual IP addresses (e.g., VIP1, VIP2, VIP3, etc.) associated with each numeric host IP address. For example, if the virtual IP address of the target physical DB host P2 is "VIP2", then based on the lookup information 900, the identification module 202 will determine that the numeric host IP address of the target physical DB host P2 is "IP2". Note that this step may invoke DNS lookup of the target host IP address. After this step, the ESB routing system 200 has a numeric address of the target physical DB host P2.

In 803, the identification module 202 identifies the particular data center where the target physical DB host is located, based on the location-specific host IP address of the target physical DB host determined in 802. For example, the identification module 202 may access IP range lookup information indicating, for a given IP address range, the symbolic name of a data center or colo associated with that IP address range. For example, FIG. 11 illustrates example IP range lookup information 1100 indicating a number of IP address ranges (e.g., the first 2 octets of the IP address, such as 10.1, 10.2, 10.3, etc.), and the symbolic name of a data center or colo (e.g., DEN, PHX, etc.) associated with each IP address range. For example, if the first 2 octets of the host IP address of the target physical DB host begins with "10.2", then based on the example IP range lookup information 1100, the identification module 202 will determine that the target physical DB host is located in the data center "PHX".

In 804, the identification module 202 determines that a particular service application or a particular instance of a service application is co-located with the target physical DB host at the particular data center identified in 803. For example, the identification module 202 may access example service application endpoint information (e.g., a static configuration map) indicating, for a given data center/colo, the service application or an instance of a service application deployed at that data center/colo. For example, FIG. 12 illustrates example service application endpoint information 1200 indicating various service applications or instances of a service application (e.g., S1, S2, S3, etc.), and the data center or endpoint (e.g., DEN, PHX, etc.) where each of these service applications are deployed. For example, if the identification module 202 determined that the target physical DB host is located at the data center "PHX", then based on the service application endpoint information 1200, the identification module 202 will determine that the instance of service application "S2" is deployed at the data center "PHX". Thereafter, the routing module 204 forwards the intercepted request to this instance of the service application, "S2", as described in various example embodiments above.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
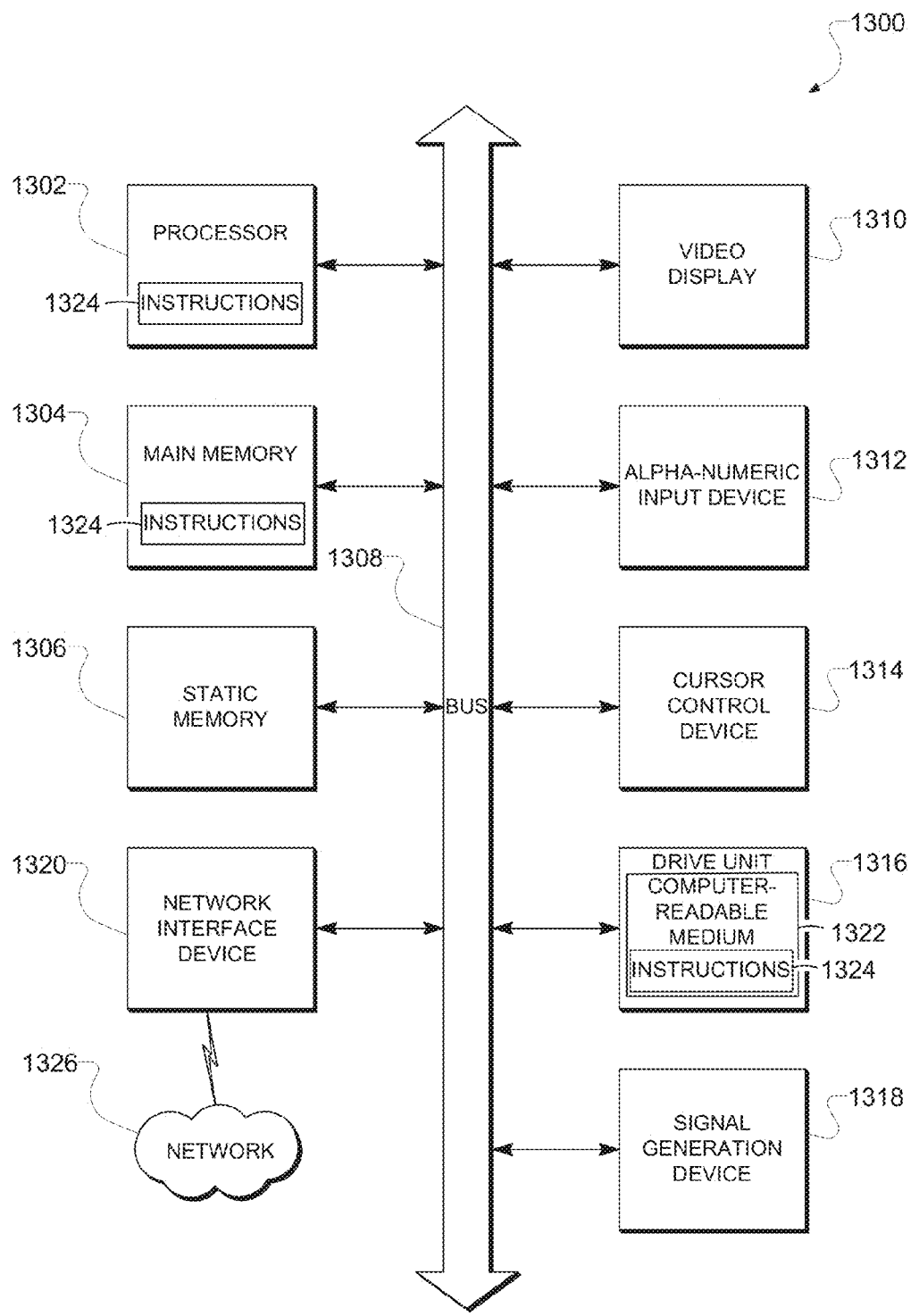
FIG. 13 is a diagrammatic representation of a machine in the example form of a computer system within which a set of instructions, for causing the machine to perform any one or more of the methodologies discussed herein, may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   intercepting a request transmitted from a client and directed to a service application, the request including a plurality of requests for data elements that are each stored in a respective logical database host of a plurality of logical database (DB) hosts;
   accessing a header of the request, the header including a hint value, wherein a format of the header includes a prefix indication of the hint value's type within a particular data access layer scheme, the prefix indication preceding the hint value;
   extracting the hint value from the header of the request, wherein the hint value comprises a value that identifies a logical DB host that is to be accessed most frequently than other logical DB hosts that will be accessed in connection with the requests for the data elements;
   identifying a target physical DB host, based on the value that identifies the logical DB host and DB host mapping information that represents relationships between respective logical DB hosts and respective physical DB hosts; and
   routing the request to an instance of the service application co-located with the identified target physical DB host at a particular data center.

2. The method of claim 1, wherein the logical DB host corresponds to a particular database partition of a database, and wherein information associated with the request is stored in the particular database partition.

3. The method of claim 1, wherein data stored in the logical DB host is accessible only by the target physical DB host.

4. The method of claim 1, further comprising:
   receiving, at the service application at the particular data center, the routed request; and
   forwarding, at the service application at the particular data center, the routed request to the target physical DB host at the particular data center.

5. The method of claim 1, wherein the hint value includes a string value of a name of the logical DB host.

6. The method of claim 1, wherein the DB host mapping information identifies, for each of a plurality of physical DB hosts, a corresponding plurality of logical DB hosts accessible by the respective physical DB host.

7. The method of claim 1, further comprising:
   determining a virtual IP address of the identified target physical DB host;
   determining a location-specific host IP address of the target physical DB host, based on the virtual IP address;
   identifying the particular data center where the target physical DB host is located, based on the location-specific host IP address of the target physical DB host; and
   determining that the instance of the service application is co-located with the target physical DB host at the particular data center.

8. The method of claim 1, wherein the request is a service-oriented architecture (SOA) service call, and wherein the hint value is embedded in a SOA transport header included in the request.

9. The method of claim 1, wherein the hint value is a static token associated with the client and represents a specific class of the client.

10. The method of claim 1, further comprising routing the request to a default instance of the service application based on a default routing decision in response to the request not including the hint value.

11. An apparatus comprising:
    a computer comprising one or more hardware processors programmed to:
    intercept a request transmitted from a client and directed to a service application, the request including a plurality of requests for data elements that are each stored in a respective logical database host of a plurality of logical database (DB) hosts;
    access a header of the request, the header including a hint value, wherein a format of the header includes a prefix indication of the hint value's type within a particular data access layer scheme, the prefix indication preceding the hint value;
    extract the hint value from the header of the request, wherein the hint value comprises a value that identifies a logical DB host that is to be accessed most frequently than other logical DB hosts that will be accessed in connection with the requests for the data elements;
    identify a target physical DB host, based on the value that identifies the logical DB host and DB host mapping information that represents relationships between respective logical DB hosts and respective physical DB hosts; and
    route the request to an instance of the service application co-located with the identified target physical DB host at a particular data center.

12. The apparatus of claim 11, wherein the logical DB host corresponds to a particular database partition of a database, and wherein information associated with the request is stored in the particular database partition.

13. The apparatus of claim 11, wherein data stored in the logical DB host is accessible only by the target physical DB host.

14. The apparatus of claim 11, wherein the service application at the particular data center receives the routed request, and forwards the routed request to the target physical DB host at the particular data center.

15. The apparatus of claim 11, wherein the hint value includes a string value of a name of the logical DB host.

16. The apparatus of claim 11, wherein the DB host mapping information identifies, for each of a plurality of physical DB hosts, a corresponding plurality of logical DB hosts accessible by the respective physical DB host.

17. The apparatus of claim 11, wherein the identification module is further configured to:
    determine a virtual IP address of the identified target physical DB host;
    determine a location-specific host IP address of the target physical DB host, based on the virtual IP address;
    identify the particular data center where the target physical DB host is located, based on the location-specific host IP address of the target physical DB host; and
    determine that the instance of the service application is co-located with the target physical DB host at the particular data center.

18. The apparatus of claim 11, wherein the request is a service-oriented architecture (SOA) service call, and wherein the hint value is embedded in a SOA transport header included in the request.

19. A non-transitory machine-readable storage medium having embodied thereon instructions executable by one or more machines to perform operations comprising:

intercepting a request transmitted from a client and directed to a service application, the request including a plurality of requests for data elements that are each stored in a respective logical database host of a plurality of logical database (DB) hosts;

accessing a header of the request, the header including a hint value, wherein a format of the header includes a prefix indication of the hint value's type within a particular data access layer scheme, the prefix indication preceding the hint value;

extracting the hint value from the header of the request, wherein the hint value comprises a value that identifies a logical DB host that is to be accessed most frequently than other logical DB hosts that will be accessed in connection with the requests for the data elements;

identifying a target physical DB host, based on the value that identifies the logical DB host and DB host mapping information that represents relationships between respective logical DB hosts and respective physical DB hosts; and routing the request to an instance of the service application co-located with the identified target physical DB host at a particular data center.

\* \* \* \* \*